(No Model.)
R. H. LAPAGE.
PIPE COUPLING.
No. 360,229. Patented Mar. 29, 1887.
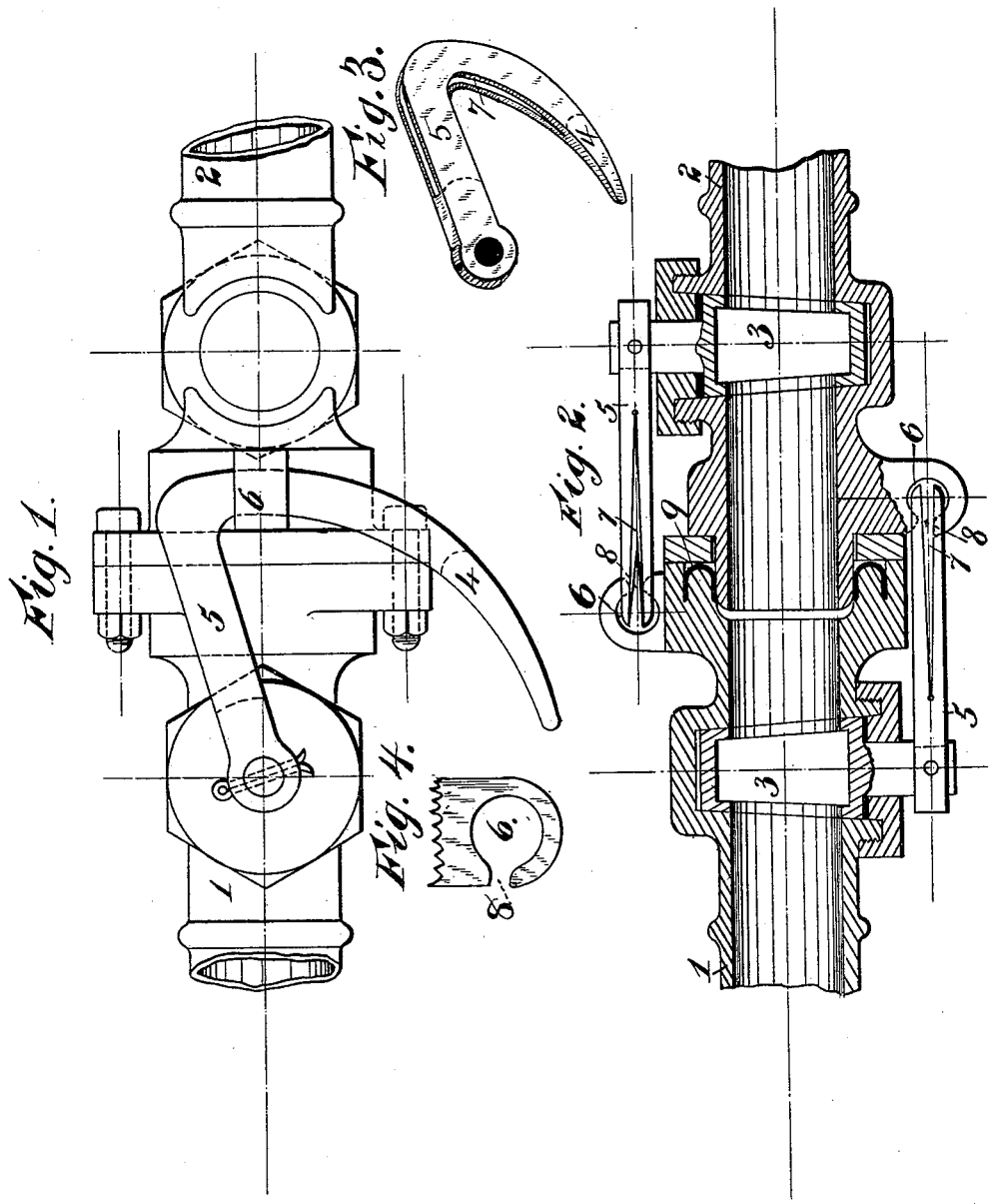

UNITED STATES PATENT OFFICE.

RICHARD HERBERT LAPAGE, OF BANK CHAMBERS, NEW OXFORD STREET, COUNTY OF MIDDLESEX, ENGLAND.

PIPE-COUPLING.

SPECIFICATION forming part of Letters Patent No. 360,229, dated March 29, 1887.

Original application filed February 23, 1886, Serial No. 192,939. Divided and this application filed August 27, 1886. Serial No. 212,013. (No model.) Patented in England April 8, 1885, No. 4,370; in Italy March 31, 1886, XXXIX, 283; in Brazil June 12, 1886, No. 366; in India August 16, 1886, No. 54; in New Zealand October 11, 1886, No. 2,058, and in New South Wales November 23, 1886, No. 1,967.

*To all whom it may concern:*

Be it known that I, RICHARD HERBERT LAPAGE, a subject of the Queen of Great Britain and Ireland, residing at Bank Chambers, New Oxford Street, in the county of Middlesex, Kingdom of Great Britain and Ireland, have invented Improvements in Pipe-Couplings, of which the following is a specification.

This invention has reference to pipe-couplings designed more particularly for connecting the several parts of a train-pipe used with continuous automatic brake apparatus of different kinds, which has been patented to me as follows: Great Britain, No. 4,370, April 8, 1885; Italy, No. 283, March 31, 1886; Brazil, No. 366, June 12, 1886; India, No. 54, August 16, 1886; New Zealand, No. 2,058, October 11, 1886; and New South Wales, No. 1,967, November 23, 1886; and this application is a division of my application No. 192,939, filed February 23, 1886, which embraces the present invention.

According to this invention the couplings employed for connecting the main pipe or pipes of one vehicle with those of another, and constituting the train-pipe of automatic brake apparatus, are such that the acts of coupling and uncoupling respectively open and close the passage for liquid.

The couplings are formed with socket and spigot ends provided with a cup leather or leathers or other suitable packing. Cocks or valves are provided to control the passage through the ends of flexible connecting-pipes, each of which is connected at one end to one of the parts of the coupling and at the other to one end of one of the pipes constituting a part of the train-pipe. Each cock has secured thereto a coupling hook, rod, bar, or lever, which, when the connection is made, opens direct communication through the connecting-pipes, while when the connection is broken the communication is closed. In this way is obviated all liability of the communication being left closed after the connecting-pipes have been coupled together, which may otherwise arise from carelessness on the part of the operator, with the result that only part of the brakes in a train will be operative. To obviate breakage of the connecting-pipes between two vehicles, should they become accidentally detached from each other, the coupling rods, bars, or levers are arranged to pull out.

Referring to the accompanying sheet of drawings, Figure 1 is a side elevation, and Fig. 2 a longitudinal section, of a pipe-coupling according to this invention. Fig. 3 is a perspective view of one of the hooked levers, and Fig. 4 is a plan view of one of the perforated and slotted lugs.

1 and 2 are the two parts of the coupling, the adjacent portions being formed with socket and spigot ends respectively.

3 3 are plugs or cocks for opening and closing communication through the connecting-pipes attached to the outer ends of the parts 1 2. The cocks are operated by hooked levers, the straight arms 5 of which are attached to the cocks.

In order to secure the parts 1 2 of the couplings, the hooked fingers 4 must be slipped into the perforated lugs 6, thus opening the cocks. A slit, 7, is formed in each finger 4 and arm 5, so as to enable the finger to slip through the slotted opening 8 in the lug 6 and the coupling to draw apart without injury to the brake flexible connections, if any portion of the train should become detached through accident or otherwise.

9 is a packing-ring, serving to make a tight connection between the two parts of the coupling.

What I claim is—

In a pipe-coupling, the combination, with a perforated and slotted lug on each of the adjoining parts of the coupling, of a valve located in each part of the coupling, and a slitted hooked lever connected with each valve and engaging with the opposite lug, all arranged and operating substantially as described.

In testimony whereof I have signed my name to this specification in the presence of two subscribing witnesses.

RICHARD HERBERT LAPAGE.

Witnesses:
  W. CROSS,
  J. J. BROUGHAM,
  *Both of 46 Lincoln's Inn Fields, London.*